June 22, 1965     HIROSHI TADO     3,190,269
COMBUSTION CHAMBERS FOR ROTARY ENGINES
Filed May 29, 1962     2 Sheets-Sheet 1

INVENTOR
Hiroshi Tado
By Stevens, Davis, Miller & Mosher
ATTORNEYS

June 22, 1965　　　HIROSHI TADO　　　3,190,269
COMBUSTION CHAMBERS FOR ROTARY ENGINES
Filed May 29, 1962　　　　　　　　2 Sheets-Sheet 2

INVENTOR
Hiroshi Tado
By Stevens, Davis, Miller & Mosher
ATTORNEYS

United States Patent Office 3,190,269
Patented June 22, 1965

3,190,269
COMBUSTION CHAMBERS FOR ROTARY
ENGINES
Hiroshi Tado, Suita-shi, Osaka, Japan, assignor to Yanmar
Diesel Engine Co., Ltd., Osaka, Japan, a corporation of
Japan
Filed May 29, 1962, Ser. No. 198,510
Claims priority, application Japan, July 7, 1961,
36/23,692
1 Claim. (Cl. 123—8)

The present invention relates to rotary engines and particularly to the construction of combustion chambers therefor of the direct fuel injection type.

The combustion chambers of rotary engines are usually flattened due to engine construction. Particularly, engines of the type to which the present invention relates and in which fuel is injected for compression ignition have rather extended periods of combustion, as contrasted to so-called Otto engines which have a carburetor and in which a gas charge is fired by spark plugs, and thus involve a serious problem of avoiding delay of combustion occurring with the transfer of the combustion chambers during the combustion period. Further, having sealing elements held in sliding contact with the inner wall of the engine housing, rotary engines are subject to limitations for fluid tightness because of their characteristic construction.

Rotary engines are also subject to limitations in connection with the construction of the combustion chambers in that the housing inner wall defining the latter is subjected to noticeable heat load, being repeatedly heated at all times without being cooled by cold gas charges as one of structural features of the type of engines.

The present invention is intended to provide a combustion chamber designed to overcome such difficulties.

According to the present invention, there is provided, in a rotary engine including a housing having an inner wall surface of epitrochoidal configuration, a rotor having outer edges in sliding contact with said inner wall surface of the housing, and a rotor shaft supporting said rotor, a combustion chamber characterized by the fact that it comprises anterior combustion chambers including a cavity or auxiliary chamber formed adjacent to each of the outer edges of said rotor on the side thereof opposite to the direction of rotation of the rotor, said anterior combustion chambers each being provided with an orifice offset with respect to said cavity or auxiliary chamber in a direction opposite to that of rotation of the rotor, recesses formed in the surface of the rotor, a first fuel injection valve disposed adjacent to the minor axis of the epitrochoid of said housing wall surface so that fuel is injected directly into said cavities or auxiliary chambers, and a second fuel injection valve disposed at an angular position advanced forward of said first fuel injection valve by approximately 10 to 30 degrees in angle of rotation of the rotor shaft so as to inject fuel when the fuel previously injected into said cavity or auxiliary chamber is fired and ejected through the orifice into the main combustion chamber.

The present invention will now be described with reference to the accompanying drawings which illustrate one embodiment of the invention.

It is to be noted that the inventive structure may be simplified by eliminating the first or second fuel injection valve where loss in performance to some extent is tolerable. Also, a spark plug or a glow lamp may be employed in place of the second fuel injection valve so that the engine may operate as an engine of the gasoline injection type or the low compression Diesel type.

Figure 2:
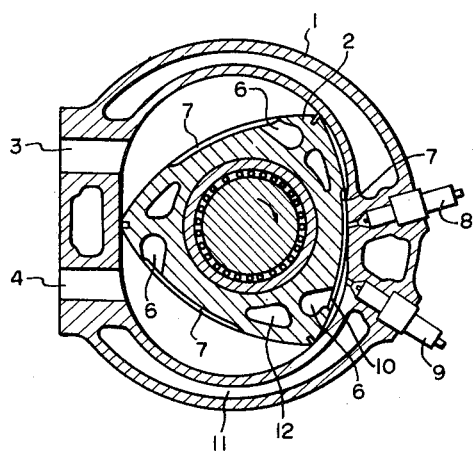
FIG. 2 is a cross-sectional view taken along the line A—A in FIG. 1.
Figure 3:
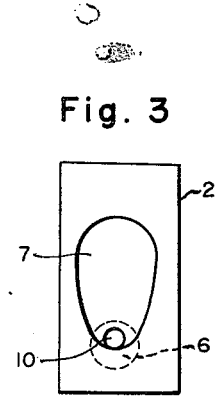
FIG. 3 is a plan view of the rotor as viewed from the side of the fuel injection valve shown in FIG. 2.
Figure 4:
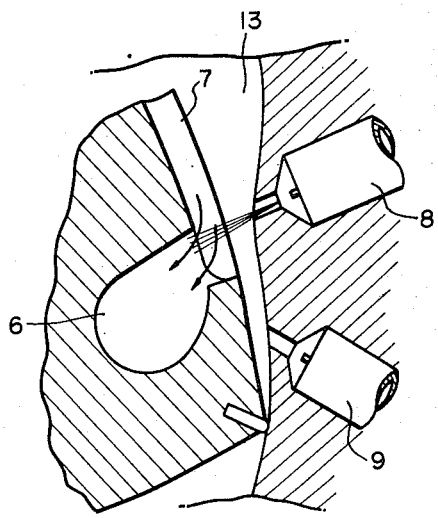
FIGS. 4 and 5 are schematic showings illustrating the different phases of operation of the combustion chamber.
Figure 5:
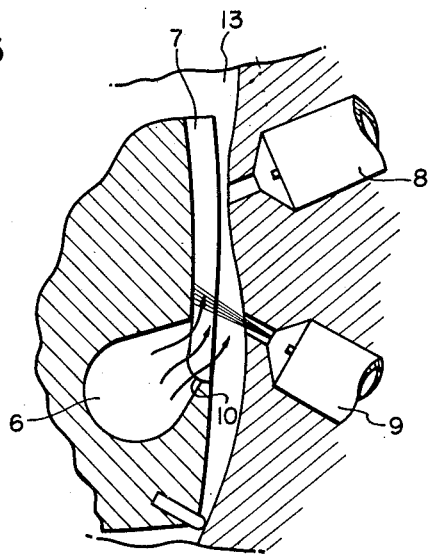

Referring to FIG. 2, the spaces defined by the rotor 2 and the inner wall of the housing form three working chambers. As the rotor rotates in the direction indicated by the arrow, the working chambers increase and decrease in volume to draw in air through a suction port 3 and subsequently compress it. As shown in FIG. 4, nearly at the end of the compression stroke, when one of cavities or auxiliary chambers 6, formed in the rotor adjacent to the end of associated one of recesses 7 also formed therein as part of the main combustion chamber, is brought into the vicinity of a first fuel injection valve 8, 50% or less of the total amount of fuel injection is ejected through the injection valve into the interior of the cavity or auxiliary chamber. During the subsequent time of ignition delay before the fuel injected is fired, the rotor continues to advance to reach the upper dead point of compression. As shown in FIG. 5, the gas charge is fired a little before the upper dead point is reached and expands to eject through the orifice 10 of the cavity or auxiliary chamber into the main combustion chamber 13 when the remainder of the fuel is ejected through a second fuel injection valve, which is disposed opposite to the orifice 10. Since this portion of fuel injection is carried by the above combustion gases which are at a high temperature into a body of fresh air in the main combustion chamber 13, the evaporation and reactions preliminary to combustion of the fuel are accelerated to provide for its rapid and smooth combustion. Specifically, the rapid pressure rise occurring with the ignition delay in the high speed engine of the compression ignition type includes no substantial portion which tends to cause rapid and violent combustion at a substantially uncontrollable speed, as the amount of fuel injection from the first fuel injection valve is rather limited. This means that satisfactory combustion can be obtained even where the maximum pressure is rather low. This situation also is very desirable from the standpoint of obtaining satisfactory airtightness with the rotor. It will be appreciated from the foregoing that, even with a flattened combustion chamber, satisfactory fuel atomization is obtainable with an improved factor of air utilization thereby providing for smooth combustion within a wide range of rotational speed.

Furthermore, the above structure, since the fuel injection valves are located adjacent to a point where the pressure difference between the opposite sides of the sealing element on the rotor is at nearly the lowest level at the time when the sealing element passes the fuel injection orifice formed in the adjacent housing wall, any substantial escape of gas charge or expansive gas is effectively prevented and this, together with the fact that the maximum combustion pressure is limited, makes the structure advantageous in obtaining desired fluidtight sealing. Further, the formation in the rotor member of cavity portions of the combustion chamber or auxiliary chambers, where the temperature is the highest during fuel combustion, is effective not only to reduce the heat load to which the cavity portions or auxiliary chambers are subjected as the latter are cooled by cold air drawn in during the suction strokes, but also is effective to reduce the heat load to which is subjected the housing region defining the combustion chamber and continually exposed to high temperatures in operation.

It will also be appreciated that with the combustion chamber according to the present invention firing is effected efficiently during slow running of the engine, particularly when the engine is started at cold temperatures, as the second fuel injection valve is arranged to eject fuel directly into the main combustion chamber at a point close to the upper dead point of the compression stroke where the air charged is compressed and heated to the extreme extent, providing for an excellent starting charcateristic of the engine.

Figure 1:
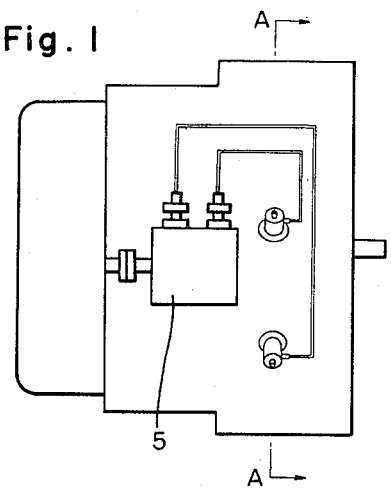
FIG. 1 is an exterior showing of the rotary engine as viewed from the combustion chamber side thereof.

Further, referring to FIG. 2, numeral 4 denotes an exhaust port through which the combustion gas is discharged exteriorly as the rotor rotates; 11, a water jacket for cooling water; and 12, a passageway through which rotor cooling oil circulates. In FIG. 1, numeral 5 denotes a fuel injection pump.

What is claimed is:

A rotary piston internal combustion engine of the epitrochoidal housing type, including a housing having an inner surface disposed about an axis, said inner surface having an epitrochoidal shape in a plane normal to said axis and enclosing a cavity, said epitrochoidal shape defining a major and a minor axis intersecting along said housing axis, a rotor disposed to rotate about its own axis as the rotor axis rotates about said housing axis, said rotor having a number of external peripheral surfaces of which adjacent surfaces intersect to form apieces which have continuous sliding contact with the inner surface of the housing, said apices defining between them a plurality of main combustion chambers, said rotor having a cavity forming an auxiliary combustion chamber adjacent the leading ends of each of said external surfaces, each of said auxiliary combustion chambers communicating with a recess in its associated external surface by an orifice having a substantially smaller cross-sectional area than the auxiliary chamber, said orifice opening in the direction opposite to the direction of rotation of the rotor; a first injector being situated in said housing adjacent the minor axis thereof and being arranged to inject fuel directly into the auxiliary chambers through said orifice as they pass the injector, a second injector situated in said housing and spaced apart from said first injector in the direction of rotor rotation, said second injector being arranged to inject fuel into each main combustion chamber as it moves past said second injector and after the fuel previously injected by said first injector into said auxiliary chamber has fired and is flowing through said orifice into said main combustion chamber.

References Cited by the Examiner

UNITED STATES PATENTS

| | | | |
|---|---|---|---|
| 813,018 | 2/06 | Okun | 123—8 |
| 1,684,074 | 9/28 | Schaeren. | |
| 2,010,469 | 8/35 | Triebnigg. | |
| 2,920,610 | 1/60 | Breelle | 123—8 X |
| 3,012,550 | 12/61 | Paschke. | |
| 3,053,238 | 9/62 | Meurer | 123—8 |

FOREIGN PATENTS

| | | |
|---|---|---|
| 1,260,221 | 3/61 | France. |
| 893,789 | 4/62 | Great Britain. |

KARL J. ALBRECHT, *Primary Examiner.*

FRED E. ENGELTHALER, JOSEPH H. BRANSON, JR., *Examiners.*